United States Patent
Hamlin et al.

(10) Patent No.: US 11,201,744 B2
(45) Date of Patent: *Dec. 14, 2021

(54) METHOD AND APPARATUS FOR GENERATION OF A TIME-BASED ONE-TIME PASSWORD FOR SESSION ENCRYPTION OF SENSOR DATA GATHERED IN LOW-PERFORMANCE AND IOT ENVIRONMENTS

(71) Applicant: Dell Products, LP, Round Rock, TX (US)

(72) Inventors: Daniel L. Hamlin, Round Rock, TX (US); Minhaj Ahmed, Allen, TX (US); Amy C. Nelson, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 16/687,437

(22) Filed: Nov. 18, 2019

(65) Prior Publication Data

US 2020/0084038 A1 Mar. 12, 2020

Related U.S. Application Data

(63) Continuation of application No. 15/646,036, filed on Jul. 10, 2017, now Pat. No. 10,484,177.

(51) Int. Cl.
*H04L 9/32* (2006.01)
*G06F 12/14* (2006.01)
(Continued)

(52) U.S. Cl.
CPC .......... *H04L 9/3228* (2013.01); *G06F 11/076* (2013.01); *G06F 11/0709* (2013.01);
(Continued)

(58) Field of Classification Search
CPC ... H04L 9/3228; H04L 67/12; H04L 63/0838; H04L 9/0863; H04L 9/14; H04L 9/0869;
(Continued)

(56) References Cited

U.S. PATENT DOCUMENTS 7,382,883 B2 6/2008 Cross
7,840,993 B2 11/2010 Ganesan
(Continued)

FOREIGN PATENT DOCUMENTS

CN 105610872 A 5/2016

OTHER PUBLICATIONS

Condry et al., "Using Smart Edge IoT Devices for Safer, Rapid Response With Industry IoT Control Operations", May 2016, IEEE, vol. 104, No. 5, pp. 938-946. (Year: 2016).*

*Primary Examiner* — Matthew Smithers
(74) *Attorney, Agent, or Firm* — Prol Intellectual Property Law, PLLC; H. Kenneth Prol

(57) ABSTRACT

A system for a time-based one-time password security system operating at a provisioning server may comprise transmitting one or more first locally generated random-string numbers for generation of a first time-based one-time password to a remotely connected internet of things sensor and a remotely connected internet of things sensor hub. The system may also comprise executing code instructions to associate the internet of things sensor with a first client key in a table stored in a memory operatively connected to the processor, associate the internet of things sensor hub with a second client key in the table, and associate the internet of things sensor and internet of things sensor hub with the one or more first locally generated random-string numbers in the table. Further the first remotely generated random-string
(Continued)

numbers may identify a first preset function for generation of a first session key used in encrypting and decrypting sensor data records.

20 Claims, 3 Drawing Sheets

(51) Int. Cl.
| | |
|---|---|
| *H04L 29/06* | (2006.01) |
| *G06F 11/07* | (2006.01) |
| *H04L 9/08* | (2006.01) |
| *H04L 9/14* | (2006.01) |
| *H04W 12/06* | (2021.01) |
| *H04L 29/08* | (2006.01) |
| *H04W 4/38* | (2018.01) |

(52) U.S. Cl.
CPC ........ *G06F 12/1408* (2013.01); *H04L 9/0863* (2013.01); *H04L 9/0869* (2013.01); *H04L 9/14* (2013.01); *H04L 63/0838* (2013.01); *H04L 67/12* (2013.01); *H04W 12/06* (2013.01); *G06F 2201/88* (2013.01); *G06F 2212/402* (2013.01); *H04L 2209/80* (2013.01); *H04W 4/38* (2018.02)

(58) Field of Classification Search
CPC .............. H04L 2209/80; G06F 12/1408; G06F 11/076; G06F 11/0709; G06F 2212/402; G06F 2201/88; H04W 12/06; H04W 4/38
See application file for complete search history.

(56) References Cited

U.S. PATENT DOCUMENTS

| | | | |
|---|---|---|---|
| 8,099,607 B2 | 1/2012 | Sandhu | |
| 8,266,435 B2 | 9/2012 | Spalka | |
| 9,306,751 B2 | 4/2016 | Wllson | |
| 9,674,161 B2 | 6/2017 | Zuerner | |
| 9,698,974 B2 | 7/2017 | Spalka | |
| 9,729,528 B2 * | 8/2017 | Zakaria | ................ H04L 9/0841 |
| 9,832,173 B2 | 11/2017 | Britt | |
| 9,858,213 B2 * | 1/2018 | Britt | ..................... H04L 9/0841 |
| 9,974,015 B2 * | 5/2018 | Zakaria | ................... H04L 67/28 |
| 10,097,517 B2 | 10/2018 | McElwee | |
| 10,097,529 B2 | 10/2018 | Kang | |
| 10,484,177 B2 * | 11/2019 | Hamlin | ................ G06F 11/076 |
| 2014/0304511 A1 | 10/2014 | Lewis | |
| 2015/0033016 A1 * | 1/2015 | Thornton | .............. H04L 63/061 |
| | | | 713/171 |
| 2016/0277933 A1 | 9/2016 | Moon | |
| 2016/0285628 A1 * | 9/2016 | Carrer | .................... H04L 9/321 |
| 2017/0006595 A1 | 1/2017 | Zakaria | |
| 2017/0093815 A1 * | 3/2017 | Chen | ..................... H04L 9/0841 |
| 2017/0171181 A1 | 6/2017 | Britt | |
| 2017/0201504 A1 * | 7/2017 | Funk | .................. H04L 63/0471 |
| 2018/0270067 A1 | 9/2018 | Woo | |
| 2018/0316658 A1 | 11/2018 | Barlett | |
| 2020/0145409 A1 * | 5/2020 | Pochuev | ............... H04L 63/061 |

* cited by examiner

METHOD AND APPARATUS FOR GENERATION OF A TIME-BASED ONE-TIME PASSWORD FOR SESSION ENCRYPTION OF SENSOR DATA GATHERED IN LOW-PERFORMANCE AND IOT ENVIRONMENTS

This application is a continuation of prior application Ser. No. 15/646,036, entitled "Method and Apparatus for Generation of a Time-Based One-Time Password for Session Encryption of Sensor Data Gathered in Low-Performance and IoT Environments," filed on Jul. 10, 2017, which is assigned to the current assignee hereof and is incorporated herein by reference in its entirety.

FIELD OF THE DISCLOSURE

The present disclosure generally relates to the field of encrypted communication of sensor data between access points in the Internet of Things, and more specifically to encryption of sensor data using session keys generated using time-based one-time passwords

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems.

The information handling system may include telecommunication, network communication, and video communication capabilities. Further, the information handling system may include transmission of encrypted sensor data.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
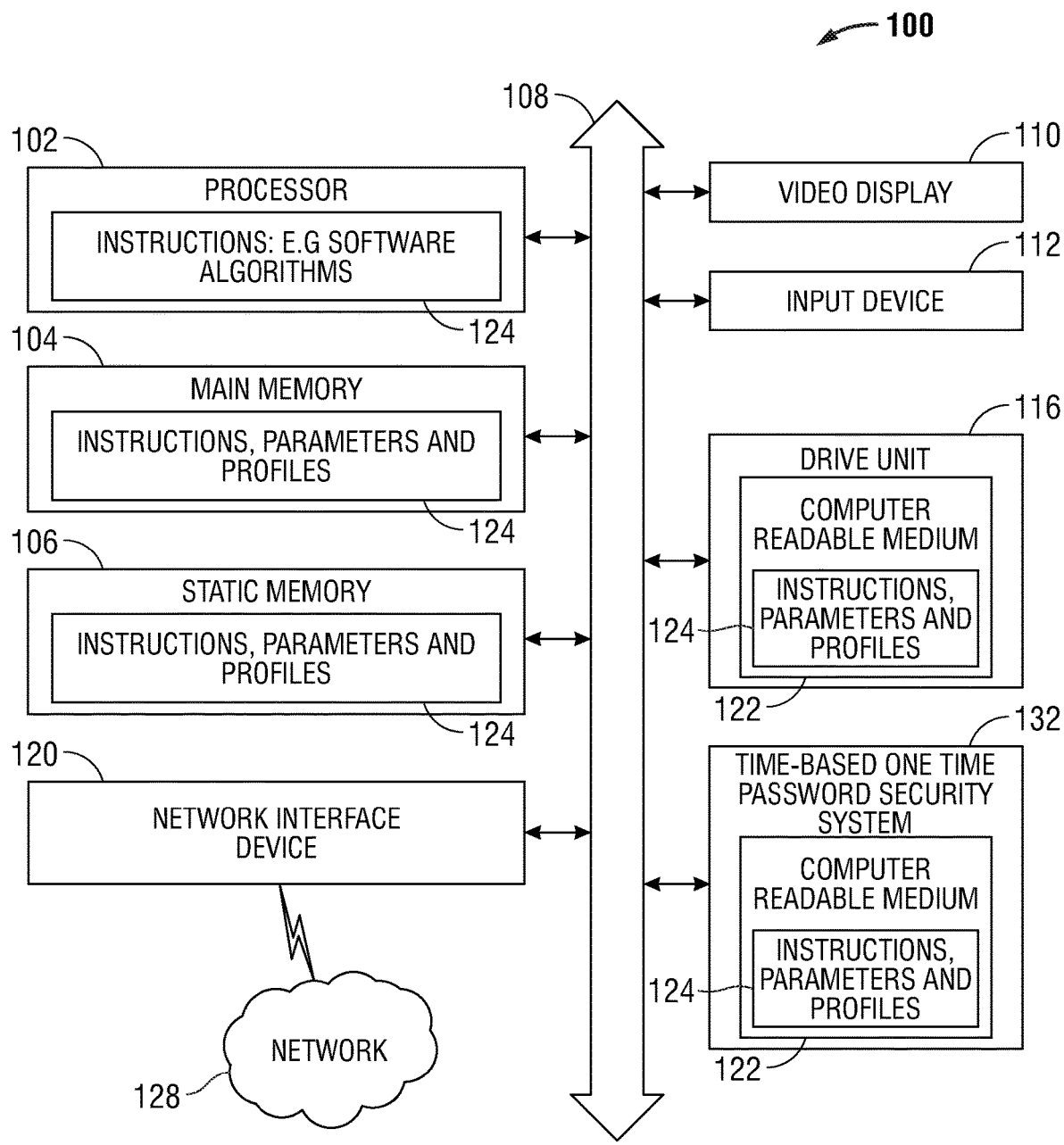
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Growing use of small, low power devices operating within the Internet of Things (IoT) has caused a proliferation of low power processing, time sensitive operations, and transportation of sensor data generated at an explosive rate within and among IoT devices. With this exponential growth of sensor data and transmission of this data comes a need to ensure that the data is protected. Current solutions to this problem include the use of session keys for cryptographic communication, which can be overly burdensome for situations where time is a factor, resources are not available or are incapable of evaluating asymmetric key exchanges for secured communications, or where session keys can be retrieved from cache in the memory and replayed. In such situations, the addition of hardware components within IoT devices and devices that interface with IoT devices may be necessary in order to increase processing and storage capabilities. These additional hardware components may be expensive, and together with computing overhead associated with common session encryption methods, may require additional time for consequentially increased processing needs. A security solution is needed that does not increase the processing time, and thus, does not require additional hardware such as power-hungry processors within small IoT devices that are designed to function under low-power conditions.

Embodiments of the present disclosure provide such a solution by providing a framework for fast processing and dynamic creation of session keys for session encryption methods based on shared time-based one-time password (TOTP) logic. A data gathering device (e.g. IoT sensor gathering sensor data) and a data evaluating device (e.g. IoT sensor hub receiving sensor data from IoT sensor) may use this framework to securely communicate with one another. In embodiments of the present disclosure, a provisioning server may generate and transmit to both a data gathering IoT device and a data evaluating device in communication with the data gathering IoT device a plurality of seed values that may be used to generate a TOTP and hash the TOTP to create a session key at both the data gathering IoT device and the data evaluating device. If both the data gathering IoT device and the data evaluating device receive the same plurality of seed values from the provisioning server in embodiments of the disclosure, the session key created at the data gathering IoT device in an embodiment may be identical to the session key created at the data evaluating device. Upon creation of the session key at the data gathering IoT device in embodiments of the present disclosure, sensor data gathered at the IoT device may be encrypted using the session key, then transmitted to the data evaluating device.

Upon receipt of the encrypted sensor data in embodiments of the present disclosure, the data evaluating device may use the identical session key to decrypt the sensor data and evaluate it.

In embodiments of the present disclosure, if the provisioning server does not provide the same plurality of seed values to the data gathering IoT device and to the data evaluating device, the session keys created by each of these devices may not be identical, and the data evaluating device may fail in attempts to decrypt the received sensor data. This may occur, for example, if the data gathering IoT device and the data evaluating device are not authorized to communicate with one another (e.g. the data evaluating device is a malicious hacker program attempting to gather private information). Each time the data evaluating device fails in an attempt to decrypt the encrypted data in embodiments of the present disclosure, an error message may be generated and transmitted to the provisioning server. Failure of a data evaluating device to decrypt the encrypted data after several attempts at decryption may indicate the data evaluating device is a malicious hacker with access to one or more of the seed values provided by the provisioning server. In such a scenario, if the number of received error messages received by the provisioning server reaches a threshold value, the provisioning server in embodiments of the present disclosure may reset the seed values associated with the data gathering IoT device and any data evaluating devices authorized to communicate with the data gathering IoT device, and may retransmit these reset seed values to such devices. In such a way, and because each TOTP is generated for only one session, embodiments of the present disclosure may create unique, non-repeatable session keys in an optimized fashion that does not require additional processors or memories for storage of session keys.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer (e.g., personal digital assistant (PDA) or smart phone), tablet computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), a tablet PC, IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality. In a networked deployment, the information handling system 100 may operate in the capacity of a server or as a client user computer in a server-client user network environment, or as a peer computer system in a peer-to-peer (or distributed) network environment. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more disk drives, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

FIG. 1 shows an information handling system 100 capable of administering each of the specific embodiments of the present disclosure. For example, the information handling system 100 can represent one or more of a sensor device operating within the Internet of Things (IoT), a mobile-edge computing gateway device operating as a wireless network access point in communication with an IoT sensor device, and/or a provisioning server located remotely from an IoT sensor device and a mobile-edge computing gateway device. An IoT sensor device, a mobile-edge computing gateway device, a remotely located provisioning server, and/or a combination of some or all of these devices and servers may execute instructions via one or more processors for a time-based one-time password security system according to embodiments disclosed herein. The time-based one-time password security system of various embodiments of the present disclosure may operate in some example embodiments as a software agent, in whole or in part, within a gateway device or other wireless network access point while other portions of the time-based one-time password security system may operate on remote server systems. Information handling system 100 may also represent a networked server or other system and administer some or all aspects of the time-based one-time password security system via instructions executed on a processor according to various embodiments herein involving remote operation of such systems.

For example, an information handling system 100 may be any mobile or other computing device capable of executing a set of instructions (sequential or otherwise) that specify actions to be taken by that machine. In a particular embodiment, the information handling system 100 can be implemented using electronic devices that provide voice, video, or data communication. Further, while a single information handling system 100 is illustrated, the term "system" shall also be taken to include any collection of systems or sub-systems that individually or jointly execute a set, or multiple sets of instructions to perform one or more computer functions.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the time-based one-time password security system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices. Portions of an information handling system may themselves be considered information handling systems.

As shown, the information handling system 100 may further include a video display 110. The video display 110 in an embodiment may function as a liquid crystal display (LCD), an organic light emitting diode (OLED), a flat panel display, a solid state display, or another type of display. Additionally, the information handling system 100 may include an alpha numeric input device 112, such as a keyboard, and/or a cursor control device, such as a mouse, touchpad, or gesture or touch screen input.

The information handling system 100 can also include a disk drive unit 116. The information handling system 100 can also represent a server device whose resources can be shared by multiple client devices, or it can represent an individual client device, such as a desktop personal computer, a laptop computer, a tablet computer, or a mobile smartphone.

Network interface device 120 represents a NIC disposed within information handling system 100, on a main circuit board of the information handling system, integrated onto another component such as processor 102, in another suitable location, or a combination thereof. The network interface device 120 can include another information handling system, a data storage system, another network, a grid management system, another suitable resource, or a combination thereof. Network interface device 120 in an embodiment may operably connect to a network 128. Connection to network 128 may be wired or wireless.

The network interface device 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection. The network interface device 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. The network interface device 120 may connect to any combination of macro-cellular wireless connections including 2G, 2.5G, 3G, 4G, 5G or the like from one or more service providers. The network interface device 120 can represent an add-in card, wireless network interface module that is integrated with a main board of the information handling system or integrated with another wireless network interface capability, or any combination thereof.

The information handling system 100 can represent a server device whose resources can be shared by multiple client devices, or it can represent an individual client device, such as a desktop personal computer, a laptop computer, a tablet computer, or a mobile phone. In a networked deployment, the information handling system 100 may operate in the capacity of a server or as a client user computer in a server-client user network environment, or as a peer computer system in a peer-to-peer (or distributed) network environment.

The information handling system 100 can include a set of instructions 124 that can be executed to cause the computer system to perform any one or more of the methods or computer based functions disclosed herein. For example, instructions 124 may execute a time-based one-time password security system, software agents, or other aspects or components. Similarly instructions 124 may execute the time-based one-time password security system disclosed herein for encrypting and decrypting sensor data using a time-based one-time password generated based on a plurality of provisioned hash variables (also referred to herein as seed values) hashed according to a defined hashing algorithm to create a unique session key, as described in greater detail below.

Various software modules comprising application instructions 124 may be coordinated by an operating system (OS), and/or via an application programming interface (API). An example operating system may include Windows®, Android®, and other OS types known in the art. Example APIs may include Win 32, Core Java API, or Android APIs.

The disk drive unit 116 and the time-based one-time password security system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 also contain space for data storage. Further, the instructions 124 may embody one or more of the methods or logic as described herein. For example, instructions relating to the time-based one-time password security system software algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the time-based one-time password security system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The time-based one-time password security system 132 and the drive unit 116 may include a computer-readable medium 122 such as a magnetic disk in an example embodiment.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The time-based one-time password security system 132 computer readable medium 122 may also contain space for data storage. The information handling system 100 may also include a time-based one-time password security system 132 that may be operably connected to the bus 108. In an embodiment, the time-based one-time password security system 132 may communicate with the main memory 104, the processor 102, the video display 110, the alpha-numeric input device 112, the signal generation device 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipset, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
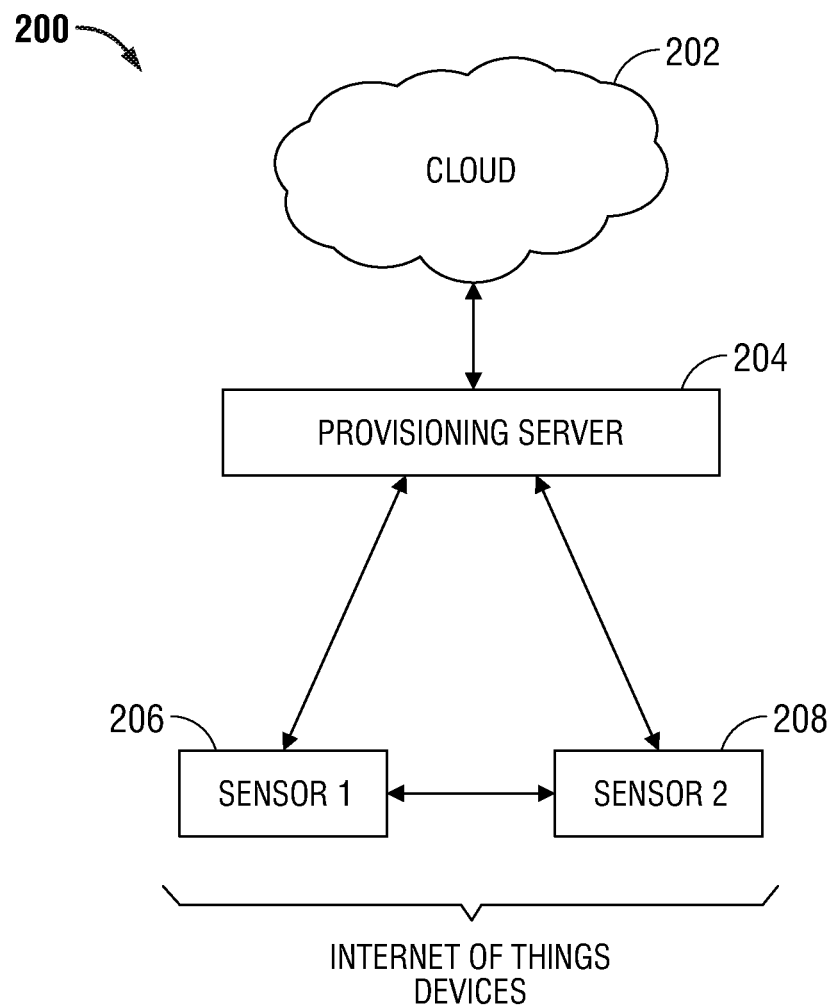
FIG. 2 is a block diagram illustrating a network of wireless access points according to an embodiment of the present disclosure.

FIG. 2 is a block diagram illustrating a network of wireless access points including a sensor data gathering device, a sensor data evaluating device, and a provisioning server according to an embodiment of the present disclosure. As shown in FIG. 2, a network of wireless access points in an embodiment may include a provisioning server 204 in communication with a cloud computing resource within the cloud 202, as well as with a plurality of sensors 206 and 208 operating within the IoT. The provisioning server 204, sensor 1 206, and sensor 2 208 may belong to a wireless personal area network (WPAN), and may each be capable of communicating directly with the cloud 202. Each of the provisioning server 204, sensor 1 206, and sensor 2 208 may include a processor and a wireless interface device for communicating with other devices within the WPAN.

In an embodiment, sensor 1 206 may be a data gathering device, or IoT sensor, operating to gather sensor data and transmit that data in a low-power environment, using as little processing power and memory as possible. For example, sensor 1 206 in an embodiment may be a thermostat, temperature probe, light-triggered camera, motion-triggered camera, voice detection device, control device, wearable device, infra-red detection device, pressure sensor, motion sensor, barometer, or any other type of sensor device in use within the Internet of Things. The IoT sensor 206 in an embodiment may be referred to within this disclosure as the data gathering device, an IoT sensor, or a sending device.

Sensor 2 208 in an embodiment may be a data evaluating device, or IoT sensor hub, operating to receive and evaluate the transmitted sensor data. Sensor 2 208 in an embodiment may also function in a low-power environment, or may include more processing and memory capabilities than sensor 1 206. For example, sensor 2 208 in an embodiment may be a smart phone, personal computer, tablet computer, remotely connected information handling system (mobile or stationary), a wearable device, remotely connected server operating within the cloud 202, or a mobile-edge computing gateway device in direct communication with the cloud 202. The IoT sensor hub 208 in an embodiment may be referred to within this disclosure as the data evaluating device, an IoT sensor hub, or a receiving device.

The provisioning server 204 in an embodiment may be a server remotely located from the sensor 1 206 and the sensor 2 208, that operates to associate a plurality of sensor devices with one another, assign a client key to each of the plurality of sensor devices, generate seed values for generation of a session key, and transmit the same generated seed values to the plurality of sensor devices associated with one another. For example, the provisioning server 204 in an embodiment may associate sensor 1 206 with sensor 2 208, and assign each of sensor 1 206 and sensor 2 208 a client key unique to each device. The provisioning server 204 in such an example embodiment may further generate a plurality of seed values that sensor 1 206 and sensor 2 208 can later use to independently create identical session keys, transmit the individual client key associated with sensor 1 206 to sensor 1 206, transmit the individual client key associated with sensor 2 208 to sensor 208, and transmit the generated seed values to both sensor 1 206 and sensor 2 208. The seed values in an embodiment may include one or more of, but may not be limited to, a secret key for hash-based message authentication code (K), a Unix time from which to start counting steps (T0), an interval used to calculate the value of a counter (TI), a hash method (H), and/or a token length (N).

In an example embodiment, the provisioning server 204 may transmit the client keys and the seed values to either or both of sensor 1 206 and sensor 208 using an asymmetric key value pair cryptography method. Asymmetric cryptography uses large numbers (keys) that have been paired together, but are asymmetrical (not identical) to encrypt and decrypt data. One of the keys may be used to encrypt data, and the other key may be used to decrypt the data. The data may be encrypted by creating a one-way hash of the data, and one of the paired asymmetric keys may be used to encrypt the hash, returning a value unique to the hashed data. Any change to the hashed, encrypted data will result in a different hash value if the process is repeated following any tampering. The data may later be decrypted by a separate device using the second of the paired asymmetric keys to produce a second hash value. If the first hash value and second hash value match, the device in receipt of the encrypted data may assume the data has not been tampered with.

The complexity of the asymmetric encryption, and the difficulty associated with cracking the encryption increases exponentially as the size of the keys used increases. However, as the size of the keys used increases, processing resources available to perform the encryption and decryption must also increase. Additionally, some asymmetric cryptography methods require additional memory for storage of a public-key infrastructure library of trusted certificates associated with each device authorized to encrypt and decrypt data using one of the keys. Thus, while embodiments of the present disclosure may use an asymmetric cryptography method to transmit the seed values from the provisioning server to the data gathering device and the data evaluating device, it may do so only once, or only a handful of times, and may not be repeated each time the data gathering device communicates data with the data evaluating device. In such a way, the provisioning server may securely transmit the seed values to these devices, but the TOTP based session encryption methods described herein may avoid incorporation of additional processor and memory components needed for routine asymmetric encrypted communication between the data gathering device and the data evaluating device.

Figure 3:
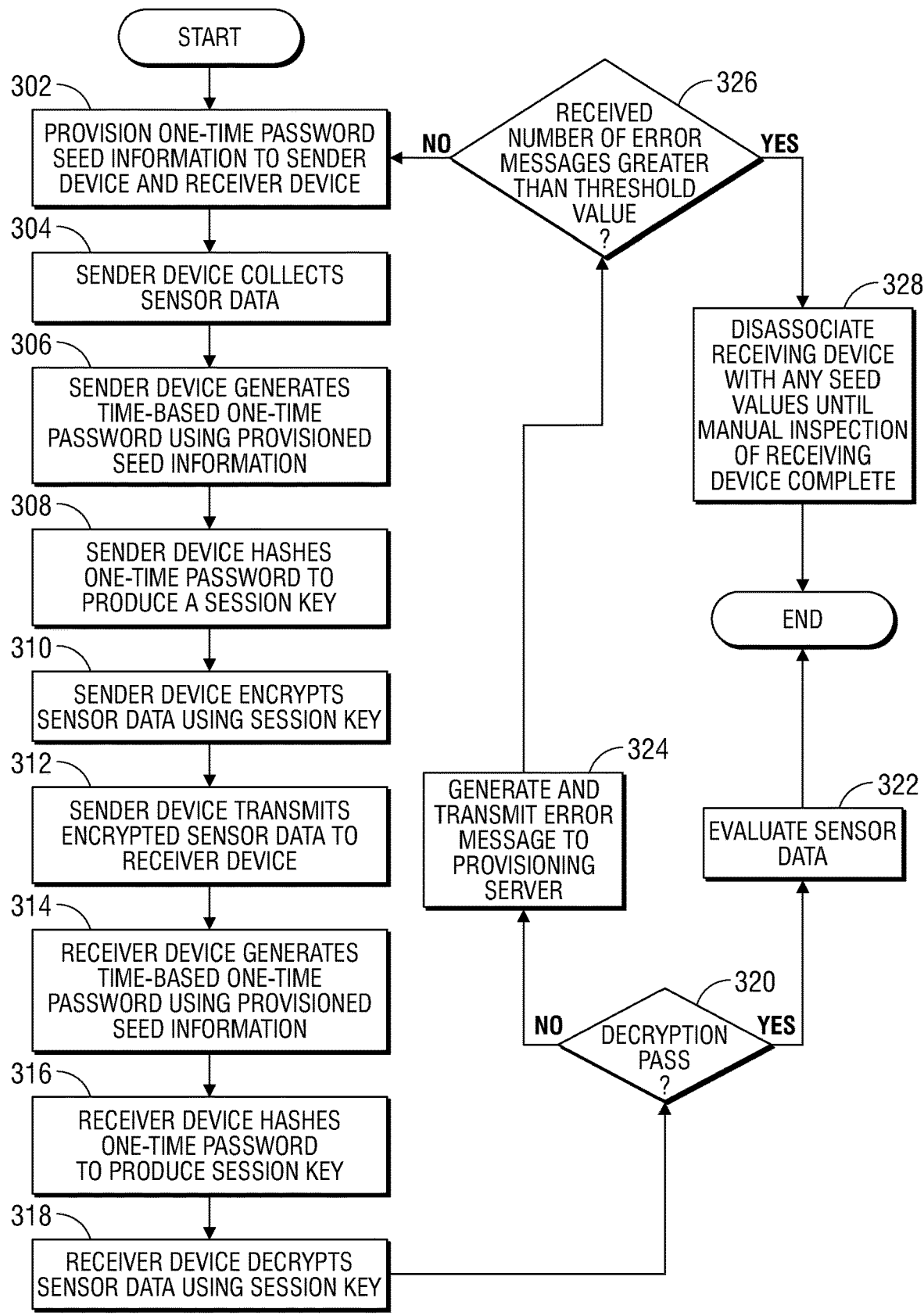
FIG. 3 is a flow diagram illustrating a method of decrypting received sensor data according to an embodiment of the present disclosure.

FIG. 3 is a flow diagram illustrating a method of decrypting received sensor data using session keys generated based on a plurality of provisioned seed information values according to an embodiment of the present disclosure. At block 302, a provisioning server in an embodiment may provision, by generating and transmitting, identical TOTP seed values to a sender device (e.g. a data gathering sensor device), and a receiver device (e.g. a data evaluating device) authorized to communicate encrypted data to one another. The provisioning server may also transmit client keys associated with and unique to each device to the respective devices with which each is associated. Example TOTP seed values in an embodiment may include, but may not be limited to a secret key for hash-based message authentication code (K), a Unix time from which to start counting steps (T0), an interval used to calculate the value of a counter (TI), a hash method (H), and/or a token length (N). One of any known hash algorithms may be used in an embodiment, including, but not limited to SHA-1, SHA-2, SHA-3, HAVAL, MD4, MD5, SHA-0, and RIPEMD-128/160. The hash method value H, transmitted to the sender device and the receiver device at block 302 may identify which of these or another hash algorithm should be used in an embodiment.

At block 304, in an embodiment, a sender device may collect sensor data. Collected sensor data in an embodiment may include time-sensitive information, and may further include measurements of temperature, ambient light, motion, ambient sound, infra-red light, pressure exerted on a surface, humidity, or ambient pressure, as well as images, voice patterns, retinal scans, fingerprint scans, control instructions, or any other type of stimulus measured by devices in use within the Internet of Things.

At block 306, in an embodiment, the sender device may generate a time-based one-time password using the provisioned seed values received at block 302 from the provisioning server. A one-time password in an embodiment may be used to generate a session key for one-time use, and does not require long-term storage of a password within a memory of a generating device. In other words, by using one-time passwords in embodiments of the present disclosure, costly and cumbersome extra memory storage is not necessary for the sending device (e.g. data sensors) operating within the IoT. A time-based one-time password in an embodiment may be used to generate a session key that may only remain valid for a preset period of time between the sending device encrypting a data communication, and a receiving device decrypting the data communication received from the sending device.

In an embodiment, a one-time password may be generated using the provisioned seed values K, T0, and T1. Using the T0 and T1 values, the sender device may determine a value for a counter (C), which may be set to zero upon generation of the TOTP by the sending device. The sender device at block 306 may generate the time-based one-time password by performing a secure hash algorithm 1 (SHA-1) on the values K and C, and optionally, concatenating and/or truncating the results of the SHA-1 hash.

At block 308, in an embodiment the sender device may further hash the time-based one-time password to produce a session key. As described above, the hash variable H within the seed values received from the provisioning server may identify the proper hash algorithm as any one of a plurality of known hash algorithms, including, but not limited to SHA-1, SHA-2, SHA-3, HAVAL, MD4, MD5, SHA-0, and RIPEMD-128/160. Other hash algorithms currently in existence or developed in the future that can be used to map data of arbitrary size to data of fixed size are also contemplated. At block 308, in an embodiment, the sender device uses the algorithm identified by the hash variable H within the received seed values to hash the TOTP generated at block 306. Hashing of the TOTP generated at block 306 with the algorithm identified by the seed value H in an embodiment may produce a session key. Because this session key may be generated based on the received seed values of K, T0, TI, and H, in an embodiment, only devices also in receipt of the same seed values, and capable of generating a TOTP within the preset time after the sending device generates its TOTP at block 308 may be capable of producing the same session key.

At block 310, in an embodiment, the sender device may encrypt the sensor data using the session key generated at block 308. In contrast to asymmetric encryption methods, the method described with reference to FIG. 3 is a symmetric encryption method—the encrypting device and decrypting device use the same session key to perform encryption and decryption of the recorded and transmitted sensor data. As described above, as the difficulty associated with cracking the encryption increases, processing resources available to perform the encryption and decryption, and memory for storage of a public-key infrastructure library of trusted certificates associated with each device authorized to encrypt and decrypt data using one of the keys must also increase. Addition of hardware such as processors and memory is an undesired necessity for IoT devices designed to function under low-power conditions.

In contrast, the symmetric encryption method described with reference to FIG. 3, which allows the sending device and receiving device to use the same session key to encrypt and decrypt the sensor data, respectively, does not involve the use of numbers of increasing length and complexity, or the storage of trusted certificates identifying each device authorized to encrypt and decrypt data using one of the keys. First, the session keys need not involve the use of exceedingly long and complex numbers because the session key is derived using a time-based one-time password created using a plurality of seed values securely communicated to the sender device and the receiving device by the provisioning server. Second, in addition to generating a time-based one-time password (TOTP), the session key used to encrypt the data is generated by further hashing the TOTP using a hashing method also described by one or more of the seed values securely communicated by the provisioning server. Thus, a device attempting to perform an unauthorized decryption would need to know each of the plurality of seed values used to generate the TOTP, and the plurality of seed values identifying the hash method used to generate the session key. Third, the sending device and the receiving device in an embodiment may not need extra memory to store one or more trusted certificates identifying each device authorized to encrypt and decrypt data using one of the keys, because the provisioning server in an embodiment may track all devices authorized to encrypt and decrypt transmitted data through the use of the client keys. In such a way, the TOTP based session encryption methods described herein may avoid incorporation of additional processor and memory components needed for routine asymmetric encrypted communication between the sending device (data gathering device) and the receiving device (data evaluating device).

At block 312, in an embodiment, the sender device may transmit the encrypted sensor data to the receiver device. The sender device may operate within the same WPAN as the receiver device, and may communicate with the receiver device wirelessly, or via a wired connection. As described above, each sensor device (e.g. the sender device and the receiver device) may include a processor and a network interface device for communicating with other devices wireless or via a wired connection. The sender device and receiver device may also communicate with one another using any number of wireless protocols available, including, but not limited to Wi-Fi, Wi-MAX, IEEE 15.4.1, and BluTooth.

At block 314, in an embodiment, the receiver device may generate a time-based one-time password using the seed values provisioned by the provisioning server at block 302. As described above, a one-time password in an embodiment does not require long-term storage of a password within a memory of the receiving device, and costly and cumbersome extra memory storage is not necessary for the receiving device. In an embodiment, the receiving device may generate a one-time password by performing the same manipulation of the provisioned seed values K, T0, and T1 described above with respect to block 306. Using the T0 and T1 values, the receiving device may determine a value for a counter (C), which may be equivalent to the time between the generation of the time-based one-time password at the sending device, and the generation of the time-based one time password at the receiving device.

As described above, a time-based one-time password in an embodiment may be used to generate a session key that may only remain valid for a preset period of time between the sending device encrypting a data communication, and a receiving device decrypting the data communication received from the sending device. In other words, if the value of the counter (C) is greater than a preset threshold value (which may also be transmitted by the provisioning server as one of the seed values), the receiving device may fail to generate a TOTP. Failure to generate a TOTP in such a scenario may indicate the transport of the encrypted sensor data from the sending device to the delivering device took too long, and may result in the receiving device transmitting a message to the sending device instructing it to re-send the sensor data and re-encrypt the sensor data using a fresh TOTP.

At block 316, in an embodiment the receiver device may further hash the time-based one-time password to produce a session key. As described above, the receiver device in an embodiment may hash the TOTP using any one of the plurality of hash algorithms defined by the provisioned hash variable H to produce a session key, including, but not limited to SHA-1, SHA-2, SHA-3, HAVAL, MD4, MD5, SHA-0, and RIPEMD-128/160. Because this session key may be generated based on the received seed values of K, T0, TI, and H, in an embodiment, the receiving device may only be capable of generating a session key identical to the session key generated by the sending device if the receiving device received the same seed values as the sending device, and the receiving device is capable of generating a TOTP within the preset time after the sending device generated its TOTP at block 308.

At block 318, in an embodiment, the receiver device may decrypt the sensor data using the session key generated at block 316. Because the method described with reference to FIG. 3 uses a symmetric encryption method, rather than an asymmetric encryption method, as described above with reference to block 310, an encrypting device and an authorized decrypting device use the same session key to perform encryption and decryption of the recorded and transmitted sensor data. Thus, the decryption performed at block 318 in an embodiment may only successfully decrypt the encrypted data received from the sending device if the session key generated by the receiving device at block 316 matches identically the session key generated by the sending device at block 310.

At block 320, the receiving device may determine whether the decryption attempt made at block 318 was successful. The decryption of block 318 in an embodiment will only be successful if the receiving device and sending device has both received identical seed values from the provisioning server in block 302, indicating the devices are authorized to communicate with one another. Thus, if the decryption of block 318 is successful in an embodiment, as determined at block 320, it may be assumed the sending device and receiving device are authorized to communicate with one another, and the method may proceed to block 322.

If the decryption of block 318 is not successful in an embodiment, as determined at block 320, it may be due to an error in transmission of the seed values from the provisioning server at block 302, an error in transmission of the encrypted data by the sending device at block 312, or could indicate the receiving device is a malicious hacker attempting an unauthorized access of the encrypted data. In all of these scenarios, the method may proceed to block 324.

At block 322 in an embodiment, the receiver device may evaluate the sensor data. As described above, if the decryption of block 318 is successful in an embodiment, as determined at block 320, it may be assumed the sending device and receiving device are authorized to communicate with one another, and the receiving device may access and analyze the decrypted sensor data received from the sending device. Upon evaluation of the sensor data at block 322 in an embodiment, the method may end.

At block 324 in an embodiment, the receiver device may generate and return an error message to the provisioning server. The error message transmitted at block 324 in an embodiment may be accompanied by a client key identifying the receiving device, as described in greater detail above. As described above, in an embodiment, if the decryption of block 318 is not successful in an embodiment, as determined at block 320, it may be due to an error in transmission of the seed values from the provisioning server at block 302, an error in transmission of the encrypted data by the sending device at block 312, or could indicate the receiving device is a malicious hacker attempting an unauthorized access of the encrypted data. In each of these cases, the receiving device in an embodiment may need the sending device to retransmit the encrypted sensor data in order for the receiver device to attempt another decryption of the data. At block 324, the receiving device in an embodiment may prompt such a retransmission of the encrypted data by transmitting an error message to the provisioning server indicating the receiving device failed to successfully decrypt the encrypted sensor data.

At block 326, in an embodiment, the provisioning server may determine whether the number of error messages it has received from the receiving device since delivery of the seed values at block 302 has exceeded a preset threshold value. In an example embodiment, failure of the receiving device to decrypt the sensor data may result from an error that may have occurred during transmission of the provisioned seed values to the receiving device, or during transmission of the encrypted data. Failure of the receiving device to decrypt the data after one, or a small number of attempts may indicate this scenario has occurred. In an embodiment encountering such a scenario, the provisioning server may generate and re-transmit new seed values to both the sender device and the receiver device in order to allow the devices to reattempt encryption and decryption of the sensor data using the new seed values. This step in an embodiment may correct any errors that may have occurred during transmission of the provisioned seed values to the receiving device, or during transmission of the encrypted data. As such, if the number of error messages received from the receiving device by the provisioning server is below a preset threshold value, the method may loop back to blocks 302-324.

In another example embodiment, if the receiving device is not an authorized or intended recipient of the data, the receiving device may not have received the same seed values from the provisioning server as the sending device, and consequently, may not be capable of generating a TOTP, and hashing the TOTP to generate the same session key as the sending device's session key. Consequently, an unauthorized recipient in an embodiment may not be capable of successfully decrypting the information. Failure of the receiving device to decrypt the data after several attempts may indicate the receiving device is not the device to which the provisioning server is repeatedly sending updated seed values, and that this scenario has occurred. As such, if the provisioning server in an embodiment determines at block 326 that the number of error messages transmitted from the receiving device to the provisioning server has exceeded a threshold value, the provisioning server may assume the receiving device is attempting an unauthorized decryption, and the method may proceed to block 328.

At block 328 in an embodiment, the provisioning server may disassociate the receiving device with any seed values until a manual inspection of the receiving device can be completed. As described above, if the provisioning server identifies repeated failures of the receiving device to decrypt the encrypted sensor data in an embodiment, despite repeated attempts of the provisioning server to refresh the provisioned seed values, the provisioning server may assume the receiving device is attempting an unauthorized decryption. In such an embodiment, the provisioning server may disassociate the receiving device, as identified by the client key transmitted along with the error message at block 324, with any seed values until manual inspection of the receiving device can be completed. By disassociating the receiving device with all seed values, the provisioning server in an embodiment may disallow the receiving device access to the values needed to decrypt data received from any sending device associated with a client key in the memory of the provisioning server.

The blocks of the flow diagram of FIG. 3 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system of an internet of things device comprising:
    a processor for operation of a sensor system;
    a network interface adapter configured to:
        receive one or more first remotely generated random-string numbers from a provisioning server via an access point, wherein the first remotely generated random-string numbers are also transmitted to an internet of things device hub; and
    the processor executing code instructions to:
        generate a limited, one-time use password using the received one or more first remotely generated random-string numbers by a one-time password algorithm;
        generate a first session key by mapping the limited, one-time use password to data of a fixed size according to a first preset function; and
        establish a secure wireless link in a session for transmission of a first encrypted sensor data record to the internet of things device hub.

2. The information handling system of claim 1 further comprising:
    the network interface to receive a second remotely generated random-string numbers for generation of a second time limited, one-time use password, wherein the second remotely generated random-string numbers are also transmitted to an internet of things device hub; and
    the processor executing code instructions to:
        generate the second time limited, one-time use password using the received one or more second remotely generated random-string numbers to generate a second session key by mapping the second time limited, one-time use password to data of a fixed size according to a second preset function; and
        establish a secure wireless link in a session for transmission of a first encrypted sensor data record to the internet of things device hub.

3. The information handling system of claim 1, wherein one of the received first remotely generated random-string numbers identifies the first preset function.

4. The information handling system of claim 2, wherein the first preset function does not match the second preset function, and wherein one of the received second remotely generated random-string numbers identifies the second preset function.

5. The information handling system of claim 1 further comprising:
    the processor generate the first encrypted sensor data record from sensor data gathered by the internet of things device for transmission to the internet of things sensor hub by encrypting the sensor data record using the first session key.

6. The information handling system of claim 1, wherein the network interface adapter receives the one or more first remotely generated random-string numbers using an asymmetric key pair cryptography method.

7. The information handling system of claim 1, wherein the one or more first remotely generated random-string numbers includes a client key identifying the internet of things sensor.

8. An information handling system of an internet of things sensor hub comprising:
    a network interface adapter to:
        receive one or more first remotely generated random-string numbers, wherein the first remotely generated random-string numbers are also transmitted to an internet of things sensor in communication with the internet of things sensor hub; and
    a processor executing code instructions to:
        generate one-time use password generated by a one-time password algorithm using the received one or more first remotely generated random-string numbers;
        generate a first session key by mapping the first time limited, one-time use password to data of a fixed size according to a preset function and establish a secure wireless link in a session to receive a first encrypted sensor data record from the internet of things sensor;
        decrypt the encrypted first sensor data record using the first session key.

9. The information handling system of claim 8 further comprising:
    the network interface adapter to:
        transmit an error message to a remotely connected provisioning server if the generated first session key does not successfully decrypt the encrypted first sensor data record;
        receive one or more second remotely generated random-string numbers;
        re-receive the re-encrypted first sensor data record from the internet of things sensor;
    the processor executing code instructions to:
        generate the second one-time use password using the received one or more second remotely generated random-string numbers;
        generate a second session key by mapping the second time limited, one-time use password to data of a fixed size according to the preset function; and
        decrypt the re-encrypted first sensor data record using the second session key.

10. The information handling system of claim 8, wherein one of the received first remotely generated random-string numbers identifies the first preset function.

11. The information handling system of claim 8, wherein the one or more first remotely generated random-string numbers includes a client key identifying the internet of things sensor hub.

12. The information handling system of claim 8 further comprising:
    the processor executing code instructions to evaluate the decrypted first sensor data record if the decryption is successful.

13. The information handling system of claim 9 further comprising:
    the processor executing code instructions to evaluate the decrypted first sensor data record if the decryption of the re-received, re-encrypted first sensor data record is successful.

14. The information handling system of claim 8, wherein the one or more of the received first remotely generated random-string numbers used to generate the one-time use password is a time-limited, one-time use password.

15. The information handling system of claim 8, wherein the network interface adapter receives the one or more first remotely generated random-string numbers using an asymmetric key pair cryptography method.

16. An information handling system of an encryption key seed provisioning server comprising:
   a network interface adapter executing code instructions to:
      transmit one or more first locally generated random-string numbers for generation of a first one-time password to a remotely connected internet of things sensor and to a remotely connected internet of things sensor hub;
   a processor executing code instructions to:
      associate the internet of things sensor with a first client key in a table stored in a memory operatively connected to the processor;
      associate the internet of things sensor hub with a second client key in the table; and
      associate the internet of things sensor and internet of things sensor hub with the one or more first locally generated random-string numbers in the table.

17. The information handling system of claim 16 further comprising:
   the processor executing code instructions to:
      upon receipt of an error message, increment an error message counter variable by a value of one and determine if the error message counter variable exceeds a security threshold value; and
      re-associate the internet of things sensor and internet of things sensor hub with one or more second locally generated random-string numbers for generation of a second one-time password.

18. The information handling system of claim 16, wherein the network interface adapter transmits the one or more first remotely generated random-string numbers using an asymmetric key pair cryptography method.

19. The information handling system of claim 16, wherein the one or more first remotely generated random-string numbers includes the first client key and the second client key.

20. The information handling system of claim 16, wherein one of the transmitted first remotely generated random-string numbers identifies a first preset function for mapping of the first time limited, one-time use password to data of a fixed size to generate a first session key used in encrypting and decrypting sensor data records by the internet of things sensor and internet of things sensor hub.

* * * * *